No. 65,862. PATENTED JUNE 18, 1867.
A. M. BAILEY.
NON-FREEZING WATER GATE.
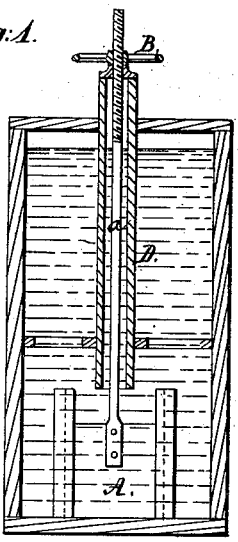
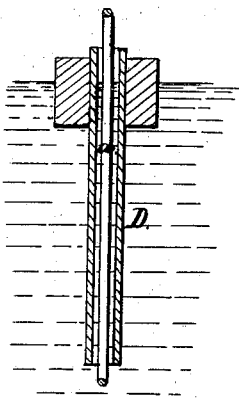
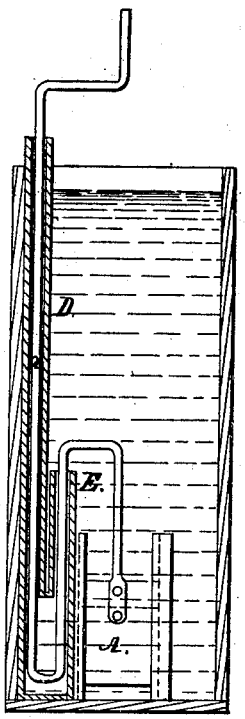
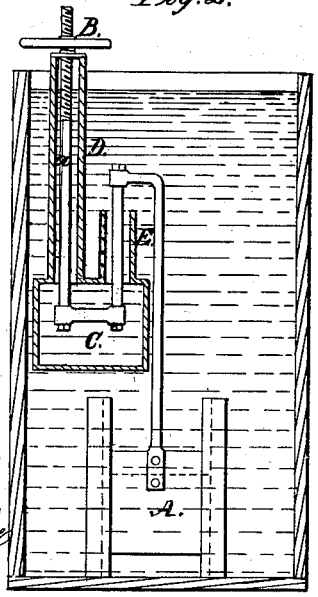
Witnesses:
D. L. Freeborn
Frank A. Hadlick
Inventor:
Alfred M. Bailey

United States Patent Office.

ALFRED M. BAILEY, OF MIDDLEFIELD, CONNECTICUT.

Letters Patent No. 65,862, dated June 18, 1867.

---

IMPROVEMENT IN NON-FREEZING WATER-GATES.

---

The Schedule referred to in these Letters Patent and making part of the same.

---

TO ALL WHOM IT MAY CONCERN:

Be it known that I, ALFRED M. BAILEY, of Middlefield, in the county of Middlesex, and State of Connecticut, have invented certain new and useful Improvements in Protecting from Freezing, applicable to the connections of water-gates, hydrants, and the like, as also to the posts, piles, and other parts immersed, or partially immersed in water, where ice is liable to form; and I do hereby declare that the following is a full and exact description thereof, as applied to the connections for operating the sluice-gate for a canal or water-wheel.

In cold weather ice is liable to form around the operating-rod, so as to involve a necessity for cutting with an axe, or otherwise, to liberate it. The necessity for this always troublesome operation becomes serious when, as in some small manufactories, the work is to be started by boys or females; and the evil becomes very formidable when a fire occurs in the night, and it is desired to start the machinery to operate the pumps or the like very suddenly.

I overcome the difficulty by enclosing the operating-rod or cord in a tube, open at both ends, and containing a quantity of oil or other liquid which is able to float on the surface of the water, and which will not congeal in ordinary cold weather. The tube must extend sufficiently above the surface of the water to prevent the oil from escaping at the top, and must descend sufficiently to prevent the oil floating away at the bottom under any ordinary conditions.

I will first describe what I consider the best means of carrying out my invention, and will afterwards designate the points which I believe to be new. The accompanying drawings form a part of this specification.

Figure 1 is a cross-section, representing the arrangement which I prefer for ordinary situations, where the water of the pond does not greatly change its level.

Figure 2 is adapted to serve in those situations where the water is liable to be drawn off entirely or to very greatly change its level.

The additional figures will be described below.

The figures represent the novel parts, with so much of the other parts as seems necessary to indicate their relations thereto.

Referring to fig. 1, A is the gate, and $a$ the operating-rod. B is the hand-wheel, by turning which the gate may be raised and lowered. Any suitable combination of levers, or other approved mechanical device, may be substituted for the threaded wheel B here represented. D is a tube, open at the bottom, and which may be open at the top. It surrounds the rod $a$ as closely as may be convenient, and contains in its interior two quarts, more or less, of refined rock oil, or other oil which will remain fluid at very low temperatures. The superior lightness of the oil tends to hold it with its upper surface a little above the water-line; and the little affinity of the water and oil for each other prevents their mixing at the surface of the water. In raising the gate the rod $a$ moves upward through the oil in the tube, and in lowering the gate the reverse movement occurs; and if the operation is performed slowly, as will usually be the case under ordinary circumstances, the oil will not be wasted. In case the level of the water rises or sinks, the oil correspondingly changes its position up and down in the tube. Only in case of the water's sinking very low will the lower surface of the oil sink so as to reach the bottom of the tube and allow any of the oil to escape. When the surface of the water commences to freeze the oil will serve as a non-conducting stratum, and preserve the water below it from freezing. The ice will form and adhere to the exterior of the tube D, and will remain there without obstructing the operation of the rod within.

Referring to fig. 2, the operating-rod is, in this form of the apparatus, very greatly crooked, and the tube is peculiarly formed, so as still to retain the oil in case the water of the pond sinks below it. $a$ is a straight portion of the rod, descending from the operating means above through a straight tube of small area, indicated by D. Below this is a box, C, in which the rod turns horizontally and then rises upward. It passes upward out of the box C, through another small tube E, which may extend to any distance desired, but which, I have assumed, is short. After rising to a considerable height above this it bends again horizontally and descends to the gate. This rod must be made thicker than usual in order to avoid the evil results from its elasticity. So long as the water is at the proper level the operation will go on as usual. When it rises the oil will rise, as before described; and when it sinks the oil will sink; but with this form of apparatus the water may sink to an indefinite extent without involving the loss of the oil. When the water sinks very low the water will remain in the box C and hold the oil above it in the tube D.

The construction is susceptible of a great many modifications; but I believe that the above will, with the aid of the drawings, enable any good mechanic to adapt it to the several situations where it is desired. It will of course be necessary to support the tube D very strongly in cases where any considerable mass of ice is liable to cling to it and depend therefrom as the water sinks.

Figure 3 represents the same arrangement as fig. 2, but with the box C more deeply immersed. It is sunk to the bottom of the flume alongside of the gate, and the connections are so crooked at the top as to balance the tendency to side strain.

Figure 4 represents a device for obviating altogether the difficulties above suggested, due to the freezing of the ice to the exterior of the tube D.

M is a float, which may be formed of a piece of pine plank, or other cheap material, of sufficient size to amply support the tube D. This float rises and sinks, and correspondingly raises and lowers the tube D, with each change of level of the water. The freezing of the ice to the exterior of the tube D produces no effect if, in any case, the ice chances to be forced upward by the force of other ice under it, or forced downward by a load of ice or other material thrown upon it. Any difficulty due to such cause is easily avoided by simply giving the tube D an increased length both above and below the water surface. The tube D and float M may be held in place by the enclosed rod $a$, or they may be guided by any other convenient means auxiliary thereto. I apprehend no difficulty, in ordinary cases, in allowing the tube D and float M to be guided by the rod $a$. In case the latter should be a slender wire or cord, or in case, for any reason, it should be necessary to relieve it from any side strain, other means, such as brackets extending out from the side of the flume, should be adopted to guide the floating parts.

I propose, as above intimated, to apply a case, open at the top and bottom, corresponding to the tube D, around the posts standing in the water, in mill-work and in other situations, employing for the casing sheet metal or any other material insoluble in water and oil, and possessing sufficient rigidity.

I do not claim covering the entire surface of water with oil or analogous fluid, to protect the entire mass from freezing; but, having now fully described my invention, what I claim as new, and desire to secure by Letters Patent, is—

1. The within-described method of protecting moving parts from freezing, the same consisting in enclosing the parts, at or near the water level, within casings which contain a fluid supported by the water and not liable to congelation, while the water outside of said casing stands at or near the same level, and is prevented by said casings from displacing the same, substantially as and for the purpose herein specified.

2. I claim floating either form of the enclosed tube, and connected parts of the above-described apparatus, so that it shall rise and sink with the water in which it is supported, or with the ice which becomes attached thereto, substantially as herein specified.

In testimony whereof I have hereunto set my hand in the presence of two subscribing witnesses.

ALFRED M. BAILEY.

Witnesses:
W. C. DEY,
FRANK. A. HADICKE.